United States Patent [19]

Duijkers

[11] Patent Number: 4,535,358

[45] Date of Patent: Aug. 13, 1985

[54] LINE SYNCHRONIZING CIRCUIT FOR A PICTURE DISPLAY DEVICES AND PICTURE DISPLAY DEVICE COMPRISING SUCH A CIRCUIT

[75] Inventor: Peter A. Duijkers, Nijmegen, Netherlands

[73] Assignee: U.S. Philips Corporation, New York, N.Y.

[21] Appl. No.: 483,084

[22] Filed: Apr. 7, 1983

[30] Foreign Application Priority Data

Apr. 13, 1982 [NL] Netherlands .................. 8201531

[51] Int. Cl.³ .......................... H03L 7/00; H04N 5/04
[52] U.S. Cl. .................................. 358/158; 358/148; 331/1 R; 331/11
[58] Field of Search ............... 358/148, 149, 150, 158, 358/159; 331/1 R, 10, 11, 20

[56] References Cited

U.S. PATENT DOCUMENTS 3,952,261  4/1976  Hara et al. ................... 331/1 R
4,214,260  7/1980  van Straaten .................. 358/148

Primary Examiner—Tommy P. Chin
Assistant Examiner—Michael D. Parker
Attorney, Agent, or Firm—Thomas A. Briody; William J. Streeter; Edward W. Goodman

[57] ABSTRACT

A line synchronizing circuit for a picture display device comprising a phase control loop for controlling a line oscillator. The circuit comprises a coincidence detector for establishing that a phase difference between the incoming line synchronizing signal and the oscillator signal is less than a predetermined value. When the output signal of the coincidence detector reaches a reference value indicating the presence of an incoming signal, the loop gain and the pull in rate, respectively, of the control loop are switched to a higher value than prior thereto. In addition, the circuit comprises a signal prolonging element which subsequently maintains the control loop in this state during a predetermined period of time. Thanks to this measure the oscillator can be pulled-in with absolute certainty.

12 Claims, 1 Drawing Figure

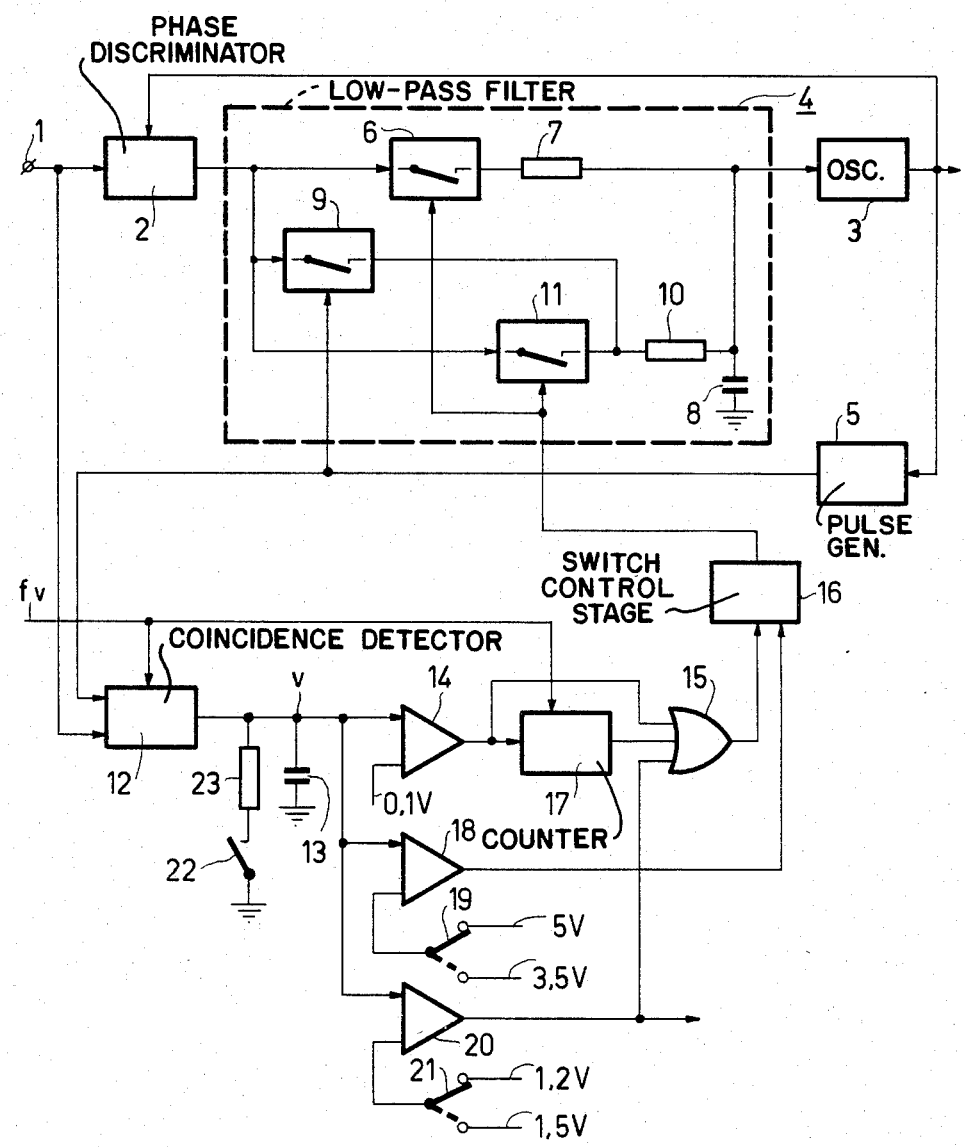

LINE SYNCHRONIZING CIRCUIT FOR A PICTURE DISPLAY DEVICES AND PICTURE DISPLAY DEVICE COMPRISING SUCH A CIRCUIT

BACKGROUND OF THE INVENTION

The invention relates to a line synchronizing circuit for a picture display device, comprising a control loop for controlling the frequency and/or the phase of a line oscillator, with means for applying an incoming line synchronizing signal and a reference signal generated by the oscillator to a phase discriminator for determining the phase difference between the applied signals and with a low-pass filter for smoothing the output signal of the phase discriminator and for applying the smoothed control signal obtained to the oscillator for controlling this oscillator, the circuit also comprising a coincidence detector for establishing that a phase difference between the incoming line synchronizing signal and the reference signal is less than a predetermined value and for switching elements of the control loop for bringing the loop into a first or a second state, respectively, in which second state the loop gain and the pull in rate, respectively, have a higher value than in the first state.

Such a synchronizing circuit is disclosed in the British Patent Specification 1,557,697. In this prior art circuit, elements of the control loop are changed over for obtaining, in the absence of coincidence, a large pull-in range and a rapid pull-in of the oscillator. For this purpose the time constant of the low-pass filter is changed to a lower value while the loop gain is given a higher value. As soon as the oscillator has the frequency and substantially the phase of the incoming line synchronizing pulses, this is to say as soon as coincidence is detected, the time constant of the filter is switched to the higher value thereof, in which state noise and interference have less influence on the oscillator, while the oscillator needs only to be readjusted to a very small degree. If coincidence is lost, for example because a change-over to a different television transmitter is effected, then an immediate switch to the lower value of the time constant is effected.

In the prior art synchronizing circuit coincidence may occur incidentally, without the oscillator having been really pulled-in, that is to say the frequency and the phase thereof are not near the target values to be achieved. Because the coincidence detector has detected coincidence, the time constant of the filter is switched to the higher value thereof and the loop gain become smaller, causing the pull-in procedure to proceed more slowly. This causes the duration of pull-in to be unnecessarily long, particularly in the case that much noise is initially received. This is a drawback, more specifically with automatic tuning systems.

SUMMARY OF THE INVENTION

It is an object of the invention to provide a line synchronizing circuit of the above-mentioned type, wherein pull-in may be effected rapidly and reliably, also in the event of large frequency deviations. To that end the line synchronizing circuit in accordance with the invention is characterized in that the circuit further comprises: a level detector for comparing the output signal of the coincidence detector with a reference level which indicates the presence of an incoming line synchronizing signal but no coincidence, and for bringing the control loop into the second state when the output signal reaches the reference value, and a signal prolonging element for subsequently maintaining the control loop in the second state during a predetermined period of time.

Owing to this measure, the period of time in which the control loop is in the second state is prolonged, so that the oscillator can pull-in with absolute certainty. Preferably, the circuit is characterized in that it also comprises a second level detector for comparing the output signal of the coincidence detector with a second reference value indicating that the phase of the line oscillator is near the target value thereof and for setting the control loop into the first state when the output signal of the coincidence detector reaches the second reference value. This ensures that the second state is not of an unnecessarily long duration which might cause instability.

The circuit may also be characterized in that the output signal of the coincidence detector is compared with a third reference value located between the first and the second reference values, the control loop being brought into the second state when the output signal reaches the third value after the second reference value.

The invention also relates to a picture display device comprising a line synchronizing circuit as characterized above.

DESCRIPTION OF THE DRAWING

The invention will now be further described by way of example with reference to the accompanying drawing. The sole FIGURE of this drawing shows a line synchronizing circuit in accordance with the invention suitable for use in a picture display device, for example a television receiver or a monitor.

DESCRIPTION OF THE PREFERRED EMBODIMENT

In the FIGURE, reference numeral 1 denotes the input terminal of the line synchronizing circuit. At this input terminal there are line synchronizing pulses whose repetition frequency is the line frequency, i.e., for example 15,625 or 15,750 Hz. For monitors the frequency may be higher. The pulses are derived in known manner in a synchronizing-separating stage, not shown, from the received video signal and are applied to an input terminal of a phase discriminator 2. The signal of a line oscillator 3 is applied to a further input terminal of discriminator 2. By means of discriminator 2, a voltage is generated which depends on the phase difference between the two input signals and is smoothed by a low-pass filter 4. The smoothed voltage obtained is the control voltage which is applied to oscillator 3 for controlling the frequency and the phase, respectively, thereof. The oscillator output signal is further processed in known manner to obtain a signal which is suitable for the line deflection. It may, for example, be applied to a phase control loop for eliminating in known manner phase changes which may occur in the line deflection circuit. The output signal is also applied to a gate pulse generator 5 which generates gate pulses which have the same frequency as the output signal of oscillator 3.

Elements 2, 3 and 4 form a phase control loop of a known type and in the synchronized state thereof the signal of oscillator 3 has the frequency and substantially the phase of the line synchronizing pulses. Filter 4 comprises the series arrangement of a switch 6 and a resistor 7, which is connected between discriminator 2 and oscillator 3 and a capacitor 8, which is connected between the elements 7 and 3 on the one hand and ground on the other hand. Parallel with series arrangement 6,7 there is a second series arrangement formed by a switch 9 and a resistor 10, which has a higher value than resistor 7, for example four times higher. A further switch 11 is arranged in parallel with switch 9. Switches 6 and 11 are operated in a manner still to be described hereinafter, while switch 9 is operated by the gate pulses of generator 5.

The gate pulses and the line synchronizing pulses are also applied to a coincidence detector 12. The output of this coincidence detector 12 is connected to a capacitor 13, whose other terminal is connected to ground, and to an input terminal of a differential amplifier 14, whose other terminal is connected to a 0.1 V reference voltage. Capacitor 13 is charged upon coincidence between the input pulses of detector 12, and it is discharged in the absence of coincidence. Across capacitor 13 there is a voltage v whose value is determined by the relative position of the input pulses and which is compared with the reference voltage by the amplifier 14, which acts as a level detector.

If a video signal is received, then the input pulses of detector 12 will as a rule, at least at the beginning, not occur simultaneously. Little noise is present at terminal 1. Voltage v is then very low, namely less than 0.1 V. In that event level detector 14 applies a "one" signal to an OR-gate 15, which is connected to a switching stage 16. Switching stage 16 has two states and operates switches 6 and 11. The signal from gate 15 sets stage 16 to the state in which these switches conduct. Switch 9 is short-circuited by the conducting switch 11, so that the gate pulses from generator 5 have no influence. In this situation resistors 7 and 10 are in parallel with each other and consequently form a resistor having a value which is one-fifth of the value of resistor 10. In these circumstances, the time constant of filter 4 has a low value. So the phase control loop responds comparatively quickly to phase changes at the input. Consequently, oscillator 3 is rapidly readjusted, as a result of which the phase difference between the incoming line synchronizing pulses and the pulses generated by the oscillator becomes increasingly less. Coincidence detector 12 detects coincidence increasingly more often, as a result of which voltage v increases.

The output signal of level detector 14 is also applied to a counter 17, the output terminal of which is connected to a second input terminal of gate 15. A signal $f_v$ of the field frequency and derived from a field oscillator (not shown) acts as a clock signal for counter 17. Counter 17 is enabled by a "zero" signal from level detector 14 and, for 3 field periods, i.e. 60 ms in accordance with the European standard, after the next pulse of the field frequency, the counter 17 generates a signal which maintains switching stage 16 in the state in which filter 4 has its shorter time constant. Therefore, after voltage v has exceeded the value 0.1 V, switching stage 16 and filter 4 remain in the same state. So counter 17 and gate 15 form together a signal prolonging element. Without counter 17, stage 16 would return, after the value 0.1 V has been reached, to the state in which switches 6 and 11 are non-conductive, in which state the control loop is only active during the occurrence of the gate pulse from generator 5, which make switch 9 conductive, while the time constant of filter 4 is determined by resistor 10 and consequently has a value which is five times longer than in the other state. Consequently, if counter 17 were not provided, oscillator 3 would be adjusted slowly and during a short portion of the time, which would considerably delay pull-in and voltage v might decrease again. So thanks to counter 17 it is ensured that the state "fast" of stage 16 is maintained for a sufficiently long period of time to ensure that the oscillator 3 is pulled-in, while the value of voltage v can have no influence.

The output terminal of coincidence detector 12 is also connected to an input terminal of a differential amplifier 18, the second input terminal of which is connected to a reference voltage which is given a value of 5 V by means of a change-over switch 19. If voltage v exceeds this value, that is to say if the phase of oscillator 3 is near its target value, then the amplifier 18, which acts as a level detector, applies a signal to switching stage 16 to adjust this stage to the "slow" position, irrespective whether counter 17 is still operative or not, while change-over switch 19 adjusts the second input terminal of level detector 18 to a value of 3.5 V. Now the loop readjusts oscillator 3 slowly. Acting thus, the phase of the oscillator 3 is prevented from exceeding the target value, which would cause an oscillatory pull-in. In the pulled-in state, in which the pulses generated by oscillator 3 have the same frequency and substantially the same phase as the incoming line synchronizing pulses, voltage v increases to about 8 V. In this state the gate pulses, whose duration is somewhat longer than the duration of the line synchronizing pulses, more specifically 7.5 $\mu$s compared with 5 $\mu$s, are substantially symmetrical in the time compared with these pulses. Noise and interferences occurring between the gate pulses do not affect the generated control information and consequently nor the phase of the oscillator 3. From the foregoing it can be seen that in the majority of cases the pull-in period will always be shorter than the delay produced by counter 17.

If the received video signal disappears, for example because a change-over to another television transmitter is effected, voltage v decreases. As the reference voltage of detector 18 is now 3.5 V, switching stage 16 remains in the "slow" state, also after voltage v has decreased to below 5 V. Not until voltage v decreases to below the value 3.5 V does the switching stage 16 not receive a signal from detector 18. A third differential amplifier 20 acting as a level detector adjusts switching stage 16 to the "fast" state, in which state switches 6 and 11 conduct, which enables a fast pull-in of oscillator 3 in the case a video signal is again received. An input terminal of detector 20 is connected to the output terminal of coincidence detector 12, while the second input terminal of this detector 20 is connected to a reference voltage of either 1.2 V or 1.5 V, via a change-over switch 21. As long as voltage v exceeds 1.2 V detector 20 applies a signal to gate 15, but this signal does not become effective until v decreases to below 3.5 V. If voltage v decreases to the value 1.2 V then no signal is applied anymore to gate 15, as a result of which switching stage 16 is readjusted to the "slow" state, while some portions of the receiver of which the present synchronizing circuit forms part can be changed-over. It is, for example, possible to switch-off the sound portion while an automatic search tuning circuit is made operative. As now the "slow" state prevails, the phase of oscillator 3 varies less in the event of noise, so that the displayed picture is disturbed to a lesser extent as would otherwise be the case. This is of particular importance if information, for example a channel indication or a volume indication, is displayed on the picture screen. A value of voltage v less than 1.2 V namely implies that only noise is received. If in these circumstances no video signal is received then voltage v decreases because of the received noise to a value of approximately 0.3 V.

If a video signal is indeed received, then a line synchronizing signal containing little noise is present on terminal 1, causing voltage v to decrease to below 0.1 V. This is the situation already described in the foregoing wherein level detector 14 applies a signal to gate 15, which adjusts switching state 16 to the "fast" state, and to counter 17, which maintains the switching state in this state. As soon as voltage v reaches the value 1.2 V, switch 21 is switched to its other position. As a result thereof the reference voltage of detector 20 becomes equal to 1.5 V, so that the change-over switches controlled by detector 20 do not return to their original position until after this new value has been reached. Otherwise, change-over actions might repeatedly occur around the value 1.2 V. It will be obvious that the inclusion of level detector 20 in the circuit must be considered to be a refinement.

A further refinement will now be described. Upon receipt of a video signal coming from a device for recording and displaying video signals, it is desirable that the line synchronizing circuit should respond rapidly. In that case, a resistor 23 having a suitable value is arranged in parallel with capacitor 13 by means of a switch 22. This causes the capacitor to be loaded on receipt of video signals in such a way that voltage v does not rise above 5 V, but remains higher than 1.2 V. The action of level detector 18 maintains switching stage 16 in the "fast" state. If the applied video signal disappears, then voltage v decreases to below 1.2 V, which causes the above-mentioned change-over actions.

The signal $f_v$ of the field frequency is also applied to coincidence detector 12 which results in the coincidence detector being inoperative during the field blanking period. In this way a disturbance is avoided which would otherwise occur because of the wide field synchronizing pulses. Detector 12 can in known manner be implemented as a phase discriminator which establishes that the phase difference between the incoming line synchronizing signal and the oscillator signal is smaller than a predetermined value. The level detectors may be constructed in a simple, known manner. Detector 18, switch 19, detector 20 and switch 21, respectively, may be constructed to have hysteresis, for example in the form of Schmitt triggers. Counter 17 may be of a simple construction, for example in the form of two flip-flops. It should be noted that the delay of 60 ms then produced is not critical, that is to say it may have a different duration, provided it is sufficiently long, which duration may alternatively be obtained by counting pulses other than pulses of the field frequency, for example pulses of the line frequency. When voltage v reaches the value 5 V, counter 17 can be made inoperative by means of detector 18, instead of acting upon stage 16. It is alternatively possible to replace the signal prolonging element formed by elements 17 and 15 by a known mono-stable element. It will be obvious that the choice of the circuit shown in the FIGURE is based on practical considerations. The same holds for capacitor 13, which may be replaced by digital means, for example a counter by means of which the number of times coincidence occurs can be mounted. Switching stage 16 can be constructed in a simple manner by means of a switching transistor, it being possible to cut-off this transistor, which conveys the signal from gate 15, by the output signal of detector 18 when voltage v reaches the value 5 V.

In the circuit described, the control loop is keyed by the gate pulses in the "slow" state, that is to say the loop is only operative during the occurrence of these pulses. This may, however, be considered as a refinement which is not absolutely necessary. It is moreover possible to use this measure in a different way, without switch 9. The circuit may, for example, comprise a coincidence stage which precedes the phase discriminator and to which the gate pulses and the line synchronizing pulses are applied. In known manner, the supply lead of the gate pulses can be interrupted in the "fast" state.

It should be noted that the circuit can be switched between a state having a short time constant, i.e. with high pull in rate and a state having a long time constant, i.e. with low pull in rate. It is obvious that the change-over may alternatively be effected in known manner by giving the loop gain a different value, for example, by changing the sensitivity of the phase discriminator or the gain of an amplifier incorporated in the loop. A higher loop gain implies a higher pull in rate and also a broader pull in range. It is also possible to change both the time constant and the loop gain at the same time.

What is claimed is:

1. A line synchronizing circuit for a picture display device, comprising a control loop for controlling the frequency and/or the phase of a line oscillator, said control loop including means for applying an incoming line synchronizing signal and a reference signal generated by the oscillator to a phase discriminator for determining the phase difference between the applied signals, and a low-pass filter for smoothing the output signal of the phase discriminator and for applying the smoothed output signal to the oscillator for controlling this oscillator, the circuit also comprising a coincidence detector for determining the phase difference between the incoming line synchronizing signal and the reference signal, and means coupled to said coincidence detector for switching elements of the control loop when said phase difference is less than a predetermined value for bringing the loop from a first into a second state, respectively, in which second state the loop gain and the pull in rate, respectively, have a higher value than in the first state, characterized in that said switching means comprises: a level detector for comparing the output signal of the coincidence detector with a first reference level which indicates the presence of an incoming line synchronizing signal but no coincidence, and for bringing the control loop into the second state until said output signal reaches the first reference level, and a signal prolonging element coupled to said level detector for subsequently maintaining the control loop in the said second state during a predetermined period of time.

2. A line synchronizing circuit as claimed in claim 1, characterized in that said switching means further comprises a switching stage and the signal prolonging element has an input terminal connected to the output terminal of the level detector and an output terminal coupled to said switching stage for switching the elements of the control loop.

3. A line synchronizing circuit as claimed in claim 2, characterized in that the signal prolonging element comprises a delay element which is enabled by the level detector when the coincidence detector output signal reaches the first reference level.

4. A line synchronizing circuit as claimed in claim 3, characterized in that the delay element is a counter for counting a predetermined number of clock pulses after the level detector has enabled said counter and that the output terminal of the level detector and the output terminal of the counter are each connected to an input terminal of a gate having an OR-function, the output terminal of which is connected to the switching stage.

5. A line synchronizing circuit as claimed in claim 4, characterized in that the clock pulses have the field frequency.

6. A line synchronizing circuit as claimed in claim 1, characterized in that said switching means further comprises a second level detector for comparing the output signal of the coincidence detector with a second reference level indicating that the phase of the line oscillator is near the phase of the incoming line synchronizing signal and for setting the control loop into the first state when the output signal of the coincidence detector reaches the second reference level.

7. A line synchronizing circuit as claimed in claim 6, characterized in that the second level detector includes a third reference level to which the output signal of the coincidence detector is compared, said third reference level being located between the first and the second reference levels, wherein the control loop is brought into the second state when the said output signal drops below the third reference level after having reached the second reference level.

8. A line synchronizing circuit as claimed in claim 7, characterized in that the switching means further comprises a third level detector for comparing the output signal of the coincidence detector with a fourth reference level located between the first and the third reference levels and for setting the control loop into the first state when the output signal reaches the fourth reference level after the third reference value.

9. A line synchronizing circuit as claimed in claim 8, characterized in that the third level detector also changes-over other portions of the picture display device when the output signal of the coincidence detector reaches the fourth reference level.

10. A line synchronizing circuit as claimed in claim 8, characterized in that the circuit comprises means for maintaining the output signal of the coincidence detector between the second and the fourth reference levels on receipt of a signal produced by a device for recording and displaying video signals.

11. A line synchronizing circuit as claimed in claim 1, wherein the incoming line synchronizing signal and a gate signal derived from the oscillator signal are applied to the coincidence detector, characterized in that in the first state the control loop is inoperative outside the occurrence of the gate signal.

12. A line synchronizing circuit as claimed in claim 1, characterized in that the coincidence detector is inoperative during the field blanking interval.

* * * * *